United States Patent Office 3,463,760
Patented Aug. 26, 1969

3,463,760
METHOD FOR COOLING MOLTEN POLYESTER PREPOLYMER
Kenneth Thomas Barkey, Rochester, N.Y., assignor to Eastman Kodak Company, Rochester, N.Y., a corporation of New Jersey
No Drawing. Filed Dec. 1, 1966, Ser. No. 598,196
Int. Cl. C08g *17/003*
U.S. Cl. 260—75          7 Claims

ABSTRACT OF THE DISCLOSURE

In the preparation of polyester prepolymers for subsequent "solid phase" polymerization (for example, in a heated fluidized bed) it has been found that by using a special method of cooling molten prepolymer, better reactivity in the subsequent solid phase polymerization reaction can be obtained. This special cooling method involves the initial spraying of water droplets under controlled conditions directly onto the top surface of molten prepolymer in order to effect controlled crystallization of the prepolymer at such surface.

---

This invention relates to the preparation of linear superpolyesters of glycols and dicarboxylic acids having a molecular weight of at least about 15,000 and ranging upward to 100,000 or more and having an intrinsic viscosity above about 0.50. More particularly, the present invention relates to an improved method of cooling to solidify a polyester prepolymer melt, by which method the melt is allowed to cool in a carefully controlled manner, thus minimizing both oxidative degradation and discoloration and resulting in the formation of a solid prepolymer product that can readily be comminuted.

The preparation of polyesters by esterification or ester exchange and condensation is well known. U.S. Patent 2,465,319 and many subsequently issued patents such as U.S. 2,727,881 describe such processes in great detail. A common feature of all such processes is that they begin with a lower dialkyl ester of a bifunctional dicarboxylic acid which is condensed with a bifunctional glycol, the glycol usually being used as such (although it can be used in the form of lower alkanoic acid ester thereof); such esters being equivalents of the glycol. Such processes involve the initial preparation, in the presence of a catalyst, of a substantially monomeric protopolymer under conditions facilitating removal of the lower alkanol formed from said lower dialkyl ester by ester interchange with said glycol. This is sometimes referred to as the first stage of the polyester preparation and it can be conducted under a variety of conditions using many different types of apparatus. For example, the lower dialkyl ester and the glycol in a mole ratio beginning at about 1 to 1.5 up to 1 to 10, or even higher, can be placed in a reaction vessel equipped with a packed column. The vessel is then heated at a temperature which permits the lower alkanol to pass through the column while the glycol is retained by the column and returned to the reaction vessel, whereby substantially all of the lower alkanol which can theoretically be produced via ester exchange with the glycol is removed during this first stage of the polyester preparation. This results in the production of a monomeric protopolymer.

The second stage of the polyester preparation involves taking the monomeric protopolymer produced during the first stage and causing such protopolymer molecules to undergo a further ester interchange reaction whereby the superfluous quantities of glycol are removed and long chain polyester molecules are produced. The polymerization of the protopolymer is accomplished under conditions facilitating removal of superfluous quantities of said glycol so that the ultimate ratio of bifunctional dicarboxylic acid moieties to glycol moieties is essentially one to one in the polymer molecule.

The polymerization of the protopolymer is generally accomplished during the earlier phases by heating at a temperature above the boiling point of the glycol at whatever pressure is used so that the glycol which is readily removable can be removed by a suitable condenser or other device attached to the reaction vessel. The pressure during this operation is generally atmospheric pressure since lower pressures may produce excessive frothing or other conditions impeding the operation. As the readily removable amounts of the glycol are removed, the temperature is generally raised and the pressure is generally reduced either in increments or gradually so as to eventually result in temperatures from 10 to 100° C. above the boiling point of the glycol and pressures of about 5 mm. of Hg pressure. Advantageously the pressure at this point is as low as the available apparatus can produce, e.g. pressures on the order of a few microns of Hg pressure. As regards the temperatures or pressures it is well recognized that excessively high temperatures will cause discoloration as a result of degradation of products whereas the use of low temperatures especially in combination with pressures as high as several centimeters of Hg pressure will necessitate longer reaction periods which contribute toward discoloration. It is, therefore, advantageous that the pressure be less than 1 cm. of Hg pressures and the temperature generally be no lower than that necessary to melt the polymer being formed.

One of the processes which can be advantageously employed in the preparation of polyesters is the solid-phase polymerization process also sometimes called the powder build-up process. Such a process involves (a) stopping the early "buildup" stage of the polymerization (during which the polymer is in a molten state) at a point where the intrinsic viscosity of the polymer (which is called a "prepolymer") is from about 0.2 to about 0.50 using the methods generally described hereinabove, (b) comminuting the prepolymer to form particles which will preferably pass through a 20 mesh screen, and (c) then heating these particles in a vacuum or under an inert circulating atmosphere at a temperature from about 10° to about 60° C. below the melting point of the polyester. The prepolymer particles are advantageously agitated and not allowed to get sufficiently hot that they fuse together. Such a powder buildup process is advantageous when a high intrinsic viscosity is desired and when no appreciable discoloration of the polyester can be tolerated.

This invention is primarily concerned with the treatment of the prepolymer prior to comminution thereof.

In the past, the procedure for cooling the prepolymer melt has usually entailed casting the melt as a fairly thin sheet onto a stainless steel belt, allowing it to cool and subsequently comminuting the particles to appropriate sizes for solid phase polymerization. Such technique is disadvantageous, however, since the total time required to cool a large batch may be as long as two hours or more during which period thermal and oxidative degradations take place resulting in an increase in color in the polyester (which is preferably colorless for most purposes, a decrease in the intrinsic viscosity and an increase in the amount of carboxyl end groups in the polyester. The latter two effects are undesirable since they increase the time required for solid phase polymerization. Further, it has been found that the higher reaction temperatures required to prepare certain polyester prepolymers, e.g. those polyesters comprising the condensation product of 1,4-cyclohexanedimethanol and dimethyl terephthalate or the condensation product of dimethyl terephthalate and ethylene glycol, made it difficult to cast them because of rapid coloration even when the melt discharging from the reactor was blanketed with an inert gas such as nitrogen. It was difficult to prevent oxidative degradation and color formation of the polyester at elevated temperatures.

Additionally, it has hitherto been necessary to cool prepolymer melts of copolyesters to just above their freezing points before casting onto a stainless steel belt. If the copolyester melt were cooled rapidly, the resultant prepolymer was highly amorphous and too tough to grind.

One method that was suggested heretofore to overcome the problems just described was to "quench" the molten polyester prepolymer in a bath of water immediately after it was poured from the reactor. This was not a satisfactory solution to the problem because such quenching resulted in the formation of a practically completely amorphous prepolymer mass that was also too tough to grind. Evidently, some method was needed whereby the prepolymer "melt" could be solidified into solid prepolymer, at least a significant proportion (i.e., at least about one-fourth) of which is in the crystalline (rather than amorphous) state.

Accordingly, it is an object of this invention to provide a method for cooling a polyester prepolymer in a carefully controlled manner whereby oxidative degradation, discoloration, carboxyl formation and decreased intrinsic viscosity are minimized and the resulting, solidified prepolymer can readily be ground.

The above objects, and other objects which will become apparent to those skilled in the art are attained by the method of this invention which, briefly, comprises rapidly discharging the prepolymer melt from the reactor, spraying the melt with water in controlled amounts and in a carefully controlled manner, and subsequently flooding the partially cooled prepolymer with a coolant.

In accordance with this invention, it has now been found that polyester prepolymer melts (such as, for example, comprising the condensation product of the reaction of 1,4-cyclohexanedimethanol with dimethyl terephthalate or the condensation product of the reaction of dimethyl terephthalate with ethylene glycol), may be rapidly and efficiently cooled with consequent minimum degradation to form readily grindable, solidified products by the process which comprises the steps of (a) rapidly discharging the melt directly from the prepolymer reactor into a receptacle to form a depth of polyester 0.5 to 30 centimeters thick and preferably 10 to 20 centimeters thick, (b) very shortly thereafter spraying the melt with a fine mist of water, and (c) subsequently flooding the resulting, partially cooled mass of prepolymer with a coolant, preferably water, after a relatively smooth, relatively crack-free layer of at least partially crystallized prepolymer has been formed on the surface of the cooling prepolymer mass.

Apparently, the benefits that can result from practicing the present invention can be obtained only if certain critical factors are observed during the crucial initial cooling stage of these processes, just after the molten prepolymer has been removed from the reactor. Thus, at this point, before the temperature of the surface of the mass of molten prepolymer has been cooled to below the melting point of the particular prepolymer being prepared, and preferably as soon as the molten material has been discharged (usually under pressure to ensure rapid removal) from the reactor, a spray of water droplets is directed onto the surface of the prepolymer "melt."

It has been found that the size of the water droplets must be maintained below about 300 microns. Preferably, the average diameter of these water droplets should be between about 0.1 and about 200 microns. When only such very small water droplets are sprayed onto the prepolymer "melt," several specific things occur concurrently.

(1) The evaporation of the droplets from the surface of the prepolymer "melt" causes the temperature at the surface of the mass of prepolymer to drop fairly quickly (but not as quickly as it would have if the "melt" had been simply "quenched" into a pool of water).

(2) On the surface of the "melt" there is fairly quickly formed an opaque "scum," because some of the cooled, solidified polymer is being crystallized.

(3) Although the surface of the melt has solidified, the interior of the mass of cooling prepolymer remains liquid for a certain period of time. This results from the relatively slow transfer of heat from the central portions of the solidifying mass through the solidified outer surfaces, and hence away from the cooling mass.

(4) The opaque surface of the solidifying "melt" remains relatively smooth and relatively crack-free. This is in contrast to that of cooled prepolymer "melt" 0.5 to 12 inches thick that is either air-cooled (or otherwise gas cooled); or immediate "quenching" with coolant as described heretofore produces an amorphous surface layer that is extremely tough and difficult to break and comminute.

It is the careful control of the water droplet size that makes it possible for all of these events to be accomplished simultaneously to produce the desired results. Thus, if a stream of water (or a spray of water droplets having average diameters above about 500 microns, for example) were directed onto the surface of the "melt," the surface would immediately be "churned" into a foam or froth (due to temporarily entrained water being explosively changed to steam), and the temperature of the mass of cooling prepolymer would be lowered so quickly that the resulting cooled material would be too highly amorphous to grind readily.

Note that in the present processes, the rate of cooling of the overall prepolymer mass is effectively "automatically" controlled within the range desired to produce the necessary, partially crystallized, prepolymer when the several specified parameters set out herein are carefully followed. For example, not only must be the water droplet size be carefully controlled in the practice of this invention, but also the total amount of water that is sprayed onto the surface of the molten mass must be carefully regulated during the critical first few minutes of the water spray treatment. Thus, during the period in which the layer of relatively smooth, partially crystallized, solidified polymer "scum" is being formed on the surface of the "melt" (the total time depending upon several factors including initial temperature, and water spray rate) between about 0.1 and about 10 pounds (and preferably between about 0.5 pound and about 4 pounds) of water per 1000 square feet of prepolymer "melt" surface per minute should be sprayed onto the surface. This rate should be maintained until the temperature of the surface being sprayed is lowered to below about 50° C. less than the melting point of the prepolymer. Preferably, the rate of water spray should be maintained so that between about 5 seconds and about 5 minutes are required for the temperature of the outer surface of the prepolymer mass to pass from about 230° C. to about 140° C.

The foregoing rate data are described in terms of pounds of water per minute per 1000 square feet of prepolymer surface area because the present processes are not dependent upon the actual amount of surface (or conversely, thickness of the layer of prepolymer "melt") so long as the layer is at least about 0.5 centimeter thick. For this reason, the particular shape of the container into which the prepolymer "melt" is dumped or poured from the reactor is not significant, insofar as the successful practice of this invention is concerned. Thus, the "melt" can be water-spray treated on a moving belt, in a "batch" type container such as an ingot mold, in a trough or series of troughs on a conveyor system, or any of a number of ways readily appreciated by the skilled artisan. If desired, the tiny water droplets described above can contain in admixture therewith any of a number of readily volatilizable materials (such as alcohols, ketones, such as acetone, alklene halides, alkyl halides, and the like) having boiling points below about 140° C. in amounts up to about 50 weight percent, but preferably less than 25 weight percent, of the water contained therein.

One other factor that is also essential to the successful practice of this invention is the flooding of the cooling prepolymer mass with a coolant after the desired, relatively smooth, partially crystallized "scum" layer has been formed, but before the entire mass of prepolymer has been solidified. This coolant can be in the form of relatively pure water, or practically any other material that is liquid at room temperature (such as ethanol, ethyl ether, methanol, acetone, isopropyl alcohol, methyl ethyl ketone, fluorinated hydrocarbons, and the like) and that can be readily separated from the resulting solidified prepolymer product when the separation is desired. It can also be a mixture of water with a water miscible volatile solvent such as methanol, ethanol or acetone, or even a volatile material alone, such as methylene chloride, the aforementioned materials, and the like; although it is preferably water. The "flooding" can be accomplished gradually (as by continuing the spraying described above until liquid water remains in contact with the surface of the prepolymer) or suddenly (as by dunking the prepolymer into a cool water bath). That such "flooding" is essential, however, is evident from the observation that, if the spray of water droplets is halted at the time the desired "scum" is formed, but before the surface temperature of the cooling prepolymer mass drops to 100° C., and no "flooding" is undertaken, either the "scum" layer will disappear or its beneficial effects will disappear due to the sharply increased surface temperatures that are caused by the large amount of heat still remaining in the central portions of the cooling prepolymer mass. Thus, "flooding" is essential, and should be maintained at least until the entire prepolymer mass has solidified, and preferably until the temperature of the central portion of the mass drops below about 200° C.

The polyesterification process of the present invention as set forth hereinabove, is analogous to similar methods set forth in the art, with the principal exception that the prepolymer melt is cooled by spraying with a fine mist of water prior to comminution and solid phase polymerization. For example, in an illustrative embodiment of this invention there is provided a process for preparing a linear superpolyester of at least one glycol and at least one dicarboxylic acid or hydrocarbon ester thereof comprising at least 50 mole percent of the acid having two carboxyl radicals attached to a carbocyclic nucleus having from 4 to 6 carbon atoms per ring, said superpolyester having a number average molecular weight of 15,000 to about 100,000, an inherent viscosity in a mixture of 60% phenol and 40% tetrachloroethane above at least about 0.50 and melting at from about 180° to about 350° C., comprising three phases as follows:

(1) Heating from about 1.05 to about 2.5 mole proportions or more of the glycol with one mole proportion of the dibasic acid in a form selected from the group consisting of the free acid, a lower alkyl (1 to 6 carbons) ester, anhydride or acid chloride thereof, at subatmospheric pressures under conditions such that at first there is removed substantially all of any water, hydrogen chloride and alkanol corresponding to the above-described forms of the dibasic acid and mostly subsequent thereto there is removed most of the excess glycol whereby an intermediate polyester prepolymer having an intrinsic viscosity of from about 0.1 to about 0.50 is obtained which is cooled by rapidly discharging the melt into a receptacle and spraying with a fine mist of water as set forth hereinabove;

(2) Comminuting the prepolymer to form solid particles substantially completely passing a 20 mesh screen with less than 20% passing a 200 mesh screen; and (3) In an enclosed polymerizing zone wherein at least 5% of the volume is occupied by the particles, heating at from 5° to 80° C. below the melting point of the prepolymer and between about 200° C. and about 300° C. in the presence of an inert gas at about atmospheric pressure which flows through said zone at from about 0.01 to about 10 ml. of inert gas per minute per gram of said particles, any of said particles more than 5 mm. from the surface being agitated into contact with said inert gas, whereby a substantially colorless superpolyester having an intrinsic viscosity of at least 0.5 and generally greater than 0.70 is obtained, said intrinsic viscosity being at least 0.1 unit greater than for said prepolymer and usually 0.2 or more units greater.

As indicated above, polyester prepolymers which are preferably treated in accordance with this invention have an intrinsic viscosity of from about 0.1 to about 0.50 and are prepared by an ester interchange reaction involving at least one glycol with at least one diester of a dibasic acid comprising at least 50 mole percent of an acid having two carboxyl radicals attached to a carbocyclic nucleus having from 4 to 6 carbon atoms per ring.

Illustrative dibasic acids which may be used include terephthalic acid, trans-hexahydroterephthalic acid, p,p'-sulfonyl-dibenzoic acid, 4,4'-diphenic acid, 4,4'-benzophenone-dicarboxylic acid, 1,2-di(p-carboxyphenyl)-ethane, 4,4'-dicarboxydiphenyl ether, etc. Fused rings can also be present such as in 2,7-, 1,5- or 2,6-naphthalene dicarboxylic acid. The acids are preferably those containing from one to two benzene rings of which at least one has the usual benzenoid unsaturation. Of course, either fused or attached rings can be present. All of the compounds named in this paragraph come within the scope of this preferred group.

Examples of other bifunctional dicarboxylic organic acids which are adapted to the formation of linear polyesters and which can be employed in accordance with this invention as described above include oxalic acid, carbonic acid, succinic acid, adipic acid, sebacic acid, azelaic acid, a,a-diethyladipic acid, dimethylmalonic acid, dicarboxyl diethyl ether, isophthalic acid, orthophthalic acid, hexahydroortho-phthalic acid, etc. Carbonic acid is an obvious equivalent included among these other acids.

In addition to mixtures of dicarboxylic organic acids, the polyesters defined in this invention can also be modified by the employment of hydroxy acids such as hydroxypivalic acid, hydroxybutyric acid, hydroxycaproic acid, p-hydroxybenzoic acid, etc.

Glycols which may be condensed with the diesters derived from the acids set forth above include, for example, ethylene glycol, 1,3-propanediol, 1,4-butanediol, 2,2-dimethyl-1,3-propanediol, 1,3-cyclohexanedimethanol, 1,4-cyclohexanediamethanol and the like.

The catalysts which may be used in the preparation of polyesters, such as described above, include organic and inorganic compounds of metals such as titanium, manganese, antimony, zinc, tin, lead, calcium, cobalt, lithium, combinations thereof, etc., heretofore utilized by those skilled in the art. The prior art, for example, discloses a great number of such catalysts, some of which are described in patents such as U.S. 2,465,319, U.S. 2,720,502, U.S. 2,727,881 and others. Specific catalysts heretofore known and which may be utilized include tetraisopropyl titanate, titanium dioxide, zinc acetate, zinc acetyl acetonate, lead oxide, calcium oxide, lithium ethoxide, antimony acetate, antimony trioxide, manganese oxides and the like. Generally, the acetates, chlorides, nitrates, sulfates, oxides and alkoxides of one or more of the metals zinc, manganese, tin, lead, titanium, antimony, cobalt and lithium are preferred. For example the catalyst systems of zinc acetate and tetraisopropyl titanate, manganese acetate and antimony triacetate are well suited to attain the desired reaction activity. The catalyst is generally utilized in a concentration of from about 0.002 percent to about 0.2 percent by weight of the reactants being condensed. Higher or lower percentages can also be employed. Generally, from about 0.001 percent to about 0.05 percent catalyst can be advantageously employed.

The following example will more clearly illustrate the process of the present invention although it is understood that the example is not intended to be a limitation of the scope thereof.

EXAMPLE

One hundred ninety-four parts, by weight, of dimethyl terephthalate, 288 parts of 1,4-cyclohexanedimethanol and 2 parts of a 14.4% solution of $$NaHTi(OC_4H_9)_6$$

in n-butanol were placed in a conventional reactor and heated with stirring to 190–200° C. The ester interchange was rapid and as soon as the methanol had all distilled out of the reaction mixture (about 20 minutes) the temperature was rapidly increased to about 270° C. The reaction was then put under reduced pressure (about 1 mm.) and the temperature raised to 300–310° C. over a 1½ hour period. The reaction became more viscous but remained colorless. The reaction mixture was then let down to atmospheric pressure with nitrogen and the resulting polymer melt was discharged in a period of about ten minutes into a series of movable troughs which were 8 inches deep and 8 inches wide. In each trough a puddle of melt 4 to 6 inches deep and 12 inches long was formed is about 10 seconds. The top of the puddle in each trough was sprayed with a fine mist of water to set the surface. The water droplets had an average particle size of about 25 microns. The water was sprayed at a rate of 2.5 pounds of water per minute per 500 square feet of "melt" surface area. Within one minute the surface had crystallized into smooth, opaque "scum" and the cake had contracted to allow water to contact the sides and bottom. The cake was then flooded with water and allowed to cool for one hour whereupon, after the water was removed therefrom, the substantially colorless cake was broken up and comminuted to an appropriate particle size for solid phase polymerization.

In the above manner, all of the polyester prepolymer melt may be cooled rapidly, initially and completely in about one hour with minimum degradation and discoloration as compared to usual practices which may require holding periods as long as two hours to discharge and cool completely the molten prepolymer.

Utilization of the above-described process allows the inside of the polyester cake to cool slowly and the entire cake to become sufficiently brittle for easy grinding. Once the cake is cooled it is drained of water, thus allowing the inner part of the cake to remain dry. Further, the process of the invention, by dissipating heat from the surface of polyester melt in the form of steam, allows treatment of relatively thick polyester cakes since they are cooled just enough from the initial water sprays to become heat stable as they cool to brittle cakes in the inert wet steam atmosphere.

Although the invention has been described in considerable detail with reference to certain specific embodiments thereof, it will be understood that variations and modifications can be effected without departing from the spirit and scope of the invention as set forth in the specification and defined in the appended claims.

What is claimed is:
1. A process that comprises the steps of
   (a) forming a layer of molten linear polyester prepolymer in a receptacle; said layer being at least about 0.5 centimeter thick;
   (b) spraying onto the top surface of said layer of molten prepolymer water in the form of droplets having an average diameter of at most about 300 microns at a rate of from about 0.1 to about 10 pounds of water per minute per 1000 square feet of surface being sprayed to thereby cool said surface and form on said surface a relatively smooth, crack-free layer of solidified prepolymer; more than one fourth of the polyester in said layer of solidified prepolymer being crystallized; and
   (c) thereafter flooding said layer of solidified prepolymer with a liquid coolant; said prepolymer having an intrinsic viscosity of from about 0.2 to about 0.5 and said polyester is a polyester of a glycol and a dicarboxylic acid.

2. A process as in claim 1, wherein said polyester is selected from the group consisting of poly(ethylene terephthalate) and poly(1,4 - dimethylcyclohexylene terephthalate).

3. A process as in claim 1, wherein said water droplets have an average diameter between about 0.1 and about 200 microns, and the rate of said spraying is between about 0.5 and about 4 pounds of said water per minute per 1000 square feet of said surface.

4. A process as in claim 1, wherein said coolant is water.

5. A process as in claim 2, wherein said water droplets have an average diameter between about 0.1 and about 200 microns, the rate of said spraying is between about 0.5 and about 4 pounds of said water per minute per 1000 square feet of said surface whereby the temperature of said surface is lowered from about 230° C. to about 140° C. in from about 5 seconds to about 5 minutes.

6. A process as in claim 5, wherein said coolant is water.

7. A process as in claim 5, wherein said water droplets contain up to about 25 weight percent of acetone.

References Cited

FOREIGN PATENTS 1,004,462    9/1965    Great Britain.

WILLIAM H. SHORT, Primary Examiner
LOUISE P. QUAST, Assistant Examiner

U.S. Cl. X.R.

260—47, 63, 76, 77